United States Patent
Kondo et al.

(10) Patent No.: US 6,690,225 B2
(45) Date of Patent: Feb. 10, 2004

(54) DC OFFSET CANCEL CIRCUIT

(75) Inventors: Fumitaka Kondo, Kasugai (JP); Shinji Saito, Kasugai (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/349,107

(22) Filed: Jan. 23, 2003

(65) Prior Publication Data

US 2003/0151443 A1 Aug. 14, 2003

(30) Foreign Application Priority Data

Feb. 5, 2002 (JP) .......................... 2002-028469

(51) Int. Cl.[7] ................................. H03L 5/00
(52) U.S. Cl. ........................ 327/307; 327/560
(58) Field of Search ................ 327/316, 307, 327/560, 62

(56) References Cited

U.S. PATENT DOCUMENTS 6,005,431 A * 12/1999 Mehr et al. ............... 327/107
6,211,716 B1 * 4/2001 Nguyen et al. ............ 327/107

FOREIGN PATENT DOCUMENTS

JP 10-308684 11/1998

OTHER PUBLICATIONS

Nikkei Electronics Oct. 23, 2000 (No. 781) Oct. 23, 2001.
Mission Impossible? A Review of Mixers for Direct–Conversion Receivers, May 2001 (From Collective Thesis of Electronic Information Communication Society) vol. J84–C No. 5 pp. 337–348.

* cited by examiner

Primary Examiner—Dinh T. Le
(74) Attorney, Agent, or Firm—Arent Fox Kintner Plotkin & Kahn, PLLC

(57) ABSTRACT

It is intended to provide a DC offset cancel circuit capable of canceling DC offset regardless TDMA system and non-TDMA system, with simple circuit structure, and applicable to dual-mode-structured receivers. Out of output signals having at least two or more phases (OUT1, OUT2, . . . ), at least any one of the signals (OUT1, . . . ) is inputted to a phase converter unit. A signal outputted from the phase converter unit and any one of other signals not inputted to the phase converter unit (OUT 2, . . . ) are inputted to a comparator unit. A comparison result obtained at the comparator unit is fedback to a signal processing section and DC offset components are cancelled. Through the phase converter unit, phase of a signal is converted so as to make phases of signals to be compared same. Thereby, signal components of different phases are cancelled out each other and DC offset components as DC components can be compared.

16 Claims, 5 Drawing Sheets

CIRCUIT BLOCK DIAGRAM OF EMBODIMENT

FIG. 1 DIAGRAM FOR ILLUSTRATING PRESENT INVENTION
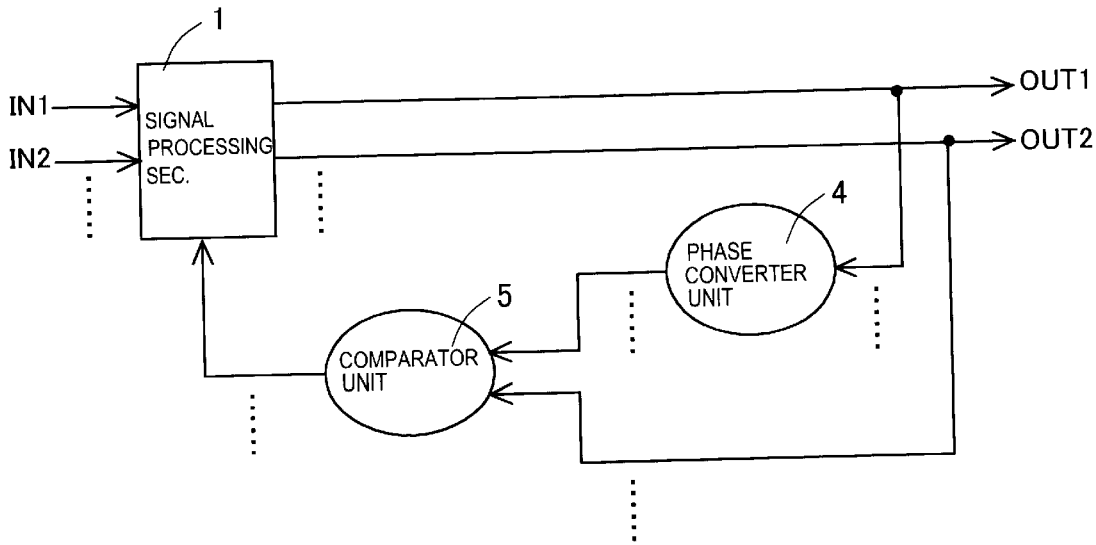
FIG. 2 CIRCUIT BLOCK DIAGRAM OF EMBODIMENT
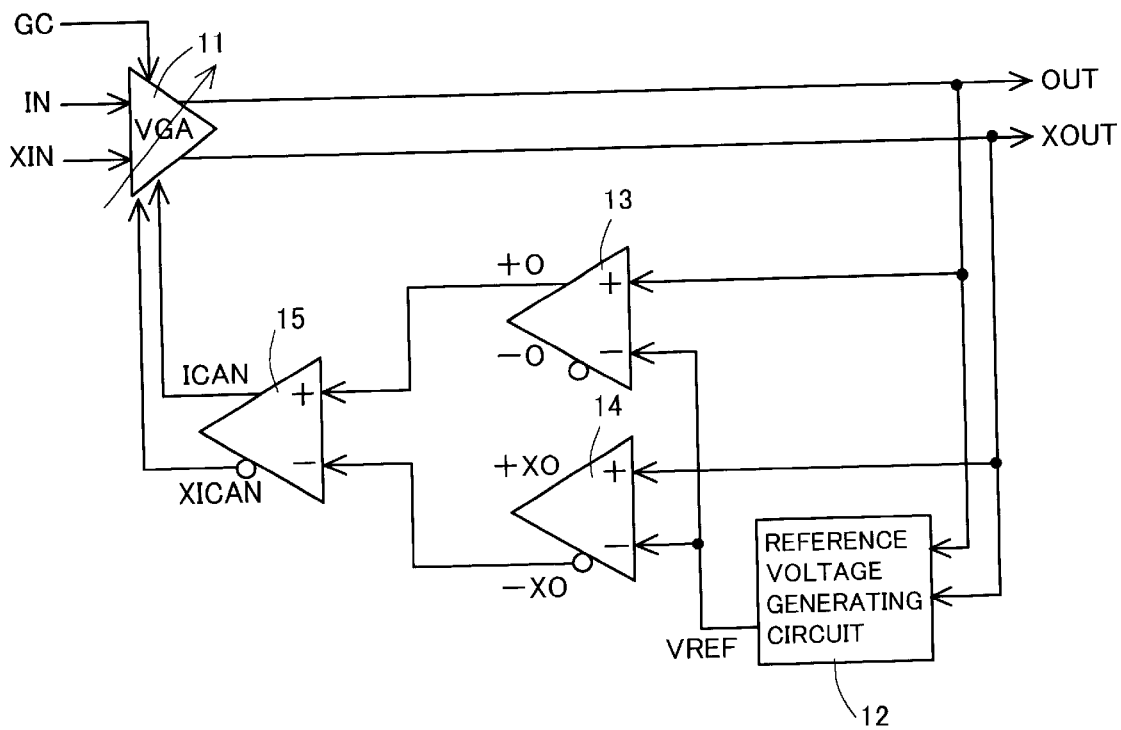

OPERATIONAL WAVEFORM DIAGRAM OF EMBODIMENT

SPECIFIC EXAMPLE OF REFERENCE VOLTAGE GENERATING CIRCUIT

FIRST PRIOR ART (CORRECTION BY HIGHPASS FILTER)

SECOND PRIOR ART (CORRECTION BY INTEGRATION CIRCUIT)

THIRD PRIOR ART (CORRECTION BY LOWPASS FILTER)

FOURTH PRIOR ART (CORRECTION BY DIGITAL ADJUSTMENT)

CONVENTIONAL DUAL MODE STRUCTURE

DC OFFSET CANCEL CIRCUIT

CROSS-REFERENCE TO RELATED APPLICATIONS

This application is based upon and claims the benefit of priority from each of the prior Japanese Patent Application No. 2002-28469 filed on Feb. 5, 2002, the entire contents of which are incorporated herein by reference.

BACKGROUND OF THE INVENTION

1. Field of the Invention

The present invention relates to cancellation of DC offset component that is likely to be included in an output signal, more particularly to a receiver used for mobile communication such as cellular phones.

2. Description of Related Art

Mobile communication appliances such as cellular phones rapidly prevailing in recent years need to meet demands on miniaturization, weight saving, and multi-function design. To meet such demands, in place of superheterodyne system conventionally used for a radio processing section, there has been widely employed direct conversion system that does not require an intermediate frequency signal (IF signal) and directly converts a radio frequency signal (RF) into a baseband signal. Since this system does not require a section for processing an IF signal, circuit scale of it can be compressed more than that of the superheterodyne system, which contributes to miniaturization, weight saving, and multi-function design of mobile communication appliance kind.

However, since the direct conversion system directly converts an RF signal into a baseband signal, this system cannot remove unnecessary DC offset components whereas DC offset components in an IF signal were removed by a band-pass filter or the like in the superheterodyne system. Accordingly, the direct conversion system requires a particular circuit for canceling DC offset.

FIG. 5 through FIG. 8 show examples of DC offset cancel circuits conventionally used. Out of those, examples of circuit structure shown in FIG. 5 through FIG. 7 are suitable for communication system such as called FDMA (frequency division multiple access), CDMA (code-division multiple access) or the like. FDMA and CDMA are communication system for receiving RF signals that succeed in terms of time. On the other hand, circuit structure shown in FIG. 8 is suitable for communication system such as called TDMA (time division multiple access) or the like. TDMA is communication system for receiving RF signals that do not succeed in terms of time. In the following descriptions, against TDMA system, communication system for receiving RF signals that succeed in terms of time will be mentioned as non-TDMA system.

It should be noted that FDMA (frequency division multiple access) is communication system that different frequencies are allocated to respective channels and CDMA (code-division multiple access) is communication system that different codes are allocated to respective channels. In both FDMA and CDMA, receiving signals succeed in terms of time. On the other hand, TDMA (time division multiple access) is communication system that channels are allocated to time slots each of which has its predetermined time length and RF signals circulate in each channel. Accordingly, receive operation is conducted in predetermined time slots only.

FIG. 5 shows circuit structure 110 directed to first prior art. In the circuit structure 110, there are provided highpass filters (HPF) 101, and 102 in signal paths that lead to differential output signals OUT, XOUT from differential input signals IN, XIN, respectively, through an amplifier (AMP) 10, whereby DC offset is cancelled. In FIG. 5, the highpass filters (HPF) 101, and 102 are provided at input side and output side of the amplifier (AMP) 10, respectively, whereby DC offset components are cut out in double. Other than this manner of DC offset cancellation, the first prior art can be structured with either one of the highpass filters (HPF). There are structured the highpass filters (HPF) 101, and 102 including capacitor elements in the signal paths, and, on demand, further including resistance elements between output side of the capacitor elements and reference voltage. In the circuit structure 110, DC offset is filtered in a form of analog signal and finally cancelled. Circuit structure as such is suitable for non-TDMA system where signals that succeed in terms of time are dealt.

FIG. 6 shows circuit structure 120 directed to second prior art. In the circuit structure 120, differential output signals OUT, XOUT are integrated by an integration circuit 103 and fedback to differential input signals IN, XIN, whereby DC offset is cancelled. The integration circuit 103 is constituted by a comparator 15 and a time constant circuit that is constituted by connecting two couples of a resistance element and a capacitor element (R101 and C101, R102 and C102) between differential input side and differential output side of the comparator 15. Differential output signals OUT, XOUT inputted through the resistance elements R101 and R102 include AC signal components as AC component and DC offset component as DC component. However, the integration circuit 103 integrates the differential output signals OUT, XOUT depending on time constant determined by the two couples of resistance element and capacitor element (R101 and C101, R102 and C102) and only predetermined DC offset components of those signals are feedback to an amplifier (AMP) 10. Although FIG. 6 shows structure that a feedback signal is directly fedback to differential input signals IN, XIN, it is possible to feedback a feedback signal to a point other than the input signals IN, XIN if it is a point capable of adjusting DC offset components of the amplifier (AMP) 10. For example, a feedback signal can be feedback to a bias current source to an input-stage differential pair of the amplifier (AMP) 10. Circuit structure as such is suitable for non-TDMA system where signals that succeed in term of time are dealt.

It should be noted that the comparator 15 is a circuit that has a predetermined gain and outputs a signal depending on differential signals of differential output signals OUT, XOUT.

FIG. 7 shows circuit structure 130 directed to third prior art. In the circuit structure 130, differential output signals OUT, XOUT are compared at a comparator 15 and differential output signals as comparison result are fedback to an amplifier (AMP) 10 through a lowpass filter constituted by two couples of a resistance element and a capacitor element (R103 and C103, R104 and C104), whereby DC offset is cancelled. The differential output signals OUT, XOUT and the comparison result include AC signal components as AC component and DC offset components as DC components. However, only predetermined DC offset components are extracted by the lowpass filter 104 and fedback to the amplifier (AMP) 10. Different from the case of FIG. 6, FIG. 7 is structured such that a feedback signal is feedback to an internal circuit such as bias current source to an input-stage differential pair of the amplifier (AMP) 10. The circuit structure 130 filters analog signals through the lowpass filter 104 and calculates a correction value of DC offset components. Circuit structure as such is suitable for non-TDMA system where signals that succeed in term of time are dealt.

FIG. 8 shows circuit structure 140 directed to fourth prior art. In the circuit structure 140, differential output signals OUT, XOUT are compared at a comparator 15 and then, converted into digital signals by an AD converter 107. To these digital signals, digital processing is applied by a digital signal processing circuit (DSP) 108 so as to output correction signals against DC offset components. Since the correction signal is a digital signal, the signal is converted into an analog signal by a DA converter 109 and fedback to an amplifier (AMP) 10. In case a predetermined time slot in a predetermined communication time cycle is set as offset-quantity detecting time like TDMA system, a correction value obtained by signal processing and calculation is stored in the digital signal processing circuit (DSP) 108 or the DA converter 109, whereby DC offset is cancelled. In the circuit structure 140, an analog signal is converted into a digital signal through signal processing and a correction value and then, a correction value of DC offset component is calculated. Circuit structure as such is suitable for TDMA system where a predetermined time slot in a predetermined communication time cycle is provided as offset-quantity detecting time and a correction value of DC offset components in the next communication time cycle is determined during this predetermined time slot.

Furthermore, as communication system of mobile radio communication appliances, different communication systems actually diversify region by region: PDC, a kind of FDMA, is prevailed in Japan whereas GSM, a kind of TDMA, is prevailed in Europe. Furthermore, there has been raised and considered W-CDMA system as the next generation communication system. Therefore, there is possibility that another different communication system will coexist with the W-CDMA system while a transitional period to the next generation communication system. So, it is considered convenient that a single communication appliance is compatible with pluralities of communication system. Due to demand as such, there have been proposed dual-mode-structured receivers capable of coping with both communication system, namely, TDMA system and non-TDMA system. FIG. 9 specifically shows circuit structure capable of changing over switches of a DC offset cancel circuit. In FIG. 9, selection circuits 105 and 106 change over switches like that in case of TDMA system, the DC offset cancel circuit uses the circuit structure 140, whereas in case of non-TDMA system, the DC offset cancel circuit uses the circuit structures 110 and 120 or 130.

However, as for the circuit structure 110, 120 and 130 directed to the first through third prior art, suitable to non-TDMA system, it is necessary to set frequency band of offset components that are to be cancelled to a sufficiently low frequency so that effective signal components in a low frequency band may not be cut out. Therefore, regarding the first prior art, capacity of capacitor elements that constitute the highpass filters (HPF) need to be set to large values so that effective signal components can surely pass there. Furthermore, regarding the second and third prior art, capacity of capacitor elements that constitute the integration circuit 103 or the lowpass filter 104 need to be set to large values so that only offset components can be feedback as correction values. Any of the circuit structure 110 through 130 is likely to need capacitor elements with large capacity. Therefore, there is a fear that a DC offset cancel circuit cannot be structured with compact circuit scale. In other words, this is an obstacle to miniaturization, weight saving, and multi-function design of receivers.

Furthermore, regarding the circuit structure 140 suitable to TDMA system, directed to the fourth prior art, a predetermined time slot in a predetermined communication time cycle is allocated as offset-quantity detecting time where offset quantity is detected without communication. Based on offset quantity detected during this offset-quantity detecting time, offset is cancelled. Accordingly, both communication operation and offset detection operation cannot be conducted successively. That is, there is a fear that the system cannot keep up with transitional fluctuation of offset quantity until the next offset-quantity detecting time.

Furthermore, in case it is intended to provide a dual-mode-structured receiver, as shown in FIG. 9, such a structured receiver must include both DC offset cancel circuit 140 suitable for TDMA system and DC offset cancel circuits 110, 120 or 130 suitable for non-TDMA system so as to switch between those circuits depending on communication system. Therefore, the receiver needs selection circuit 105, 105, 106, 106 for controlling selection of DC offset cancel circuits and control circuit (not shown) for outputting control signals. Addition of such items makes circuit scale large nevertheless miniaturization and weight saving design is nowadays demanded for mobile radio communication appliances such as cellular phone. It is problematic.

Furthermore, in case it is a dual-mode-structured receiver, it is conceivable to use the circuit structure 110, 120, and 130, directed to the first, second, and third prior art, respectively, for TDMA system. However, as described in advance, the circuit structure 110, 120 and 130 need large capacity of capacitor elements. Therefore, in case the circuit structure 110, 120 and 130 are used in TDMA system where a predetermined time slot in a predetermined communication time cycle is allocated to each channel and a signal is received during only this predetermined time slot, rising time of a reception signal takes long in a predetermined time slot. As a result, there arises a fear that the system cannot keep up with high-speed operation.

Furthermore, for a dual-mode-structured receiver, the circuit structure 140 suitable to TDMA, directed to the fourth prior art, cannot cope with non-TDMA system. Since the circuit structure 140 is structured for detecting offset quantity in a predetermined time slot allocated as offset-quantity detecting time, it is impossible to stop communication for offset quantity detection and to secure particular time. Thus, the circuit structure 140 cannot cope with non-TDMA system that requires successive communications.

SUMMARY OF THE INVENTION

Accordingly, it is an object of the present invention to provide a DC offset cancel circuit capable of canceling DC offset regardless TDMA system and non-TDMA system, with simple circuit structure, and applicable to dual-mode-structured receivers.

To achieve the object, according to one aspect of the present invention, there is provided a DC offset cancel circuit for canceling DC offset components between signals that constitute output signals having at least two phases different to each other when the output signals are outputted from a signal processing section, the DC offset cancel circuit comprising: a phase conversion section for converting at least any one of the output signals into at least any one of phase-converted signals phase of which is same as a phase of at least any one of other output signals; and a comparator section for comparing one of the other output signals and the phase-converted signal and for feeding-back a comparison result to the signal processing section.

In the DC offset cancel circuit directed to one aspect of the present invention, at least any one of the output signals is converted into at least any one of phase-converted signals phase of which is same as phase of at least any one of other output signals. Since one of the phase-converted signals and one of the other output signals are in same phase, DC components of these signals are compared and a comparison result is fedback to the signal processing section.

Thereby, even if DC offset components are included between two output signals phases of which are different from each other, a phase of one of the output signals is converted to same as that of other output signal to be compared, and phase components between these two signals are cancelled out each other. Thereby, DC offset components as DC components between the two signals can be compared. In the DC offset cancel circuit directed to one aspect of the present invention, DC offset can be cancelled as follows: (1) signal components of two signals phases of which are different from each other are cancelled out each other; (2) DC offset components as DC components are extracted; (3) the DC offset components are compared; and (4) a comparison result is fedback to the signal processing section for canceling DC offset. DC offset cancel operation such as above can be done without conducting filtering integration operation using a capacitor element, or without setting a predetermined time slot as offset-quantity detection time using a predetermined signal processing circuit.

According to another aspect of the present invention, there is provided a DC offset cancel circuit for canceling DC offset components between two differential output signals when the differential output signals are outputted from a signal processing section, the DC offset cancel circuit comprising: a first differential amplifier to which one of the differential output signals is inputted; a second differential amplifier to which other one of the differential output signals is inputted; a reference voltage generating section that inputs reference voltage to the first differential amplifier and the second differential amplifier; and a comparator that compares a first output signal and a second output signal outputted from the fist differential amplifier and outputted the second differential amplifier, respectively.

In the DC offset cancel circuit directed to another aspect of the present invention, one of the differential output signals outputted from the signal processing section and the reference voltage outputted from the reference voltage generating section are inputted to the first differential amplifier. One of the differential output signals is differentially amplified with reference to a reference voltage through the first differential amplifier and this differentially amplified signal is outputted from the first differential amplifier as a first output signal. Furthermore, other one of the differential output signals outputted from the signal processing section and the reference voltage outputted from the reference voltage generating section are inputted to the second differential amplifier. Other one of the differential output signals is differentially amplified with reference to a reference voltage through the second differential amplifier and this differentially amplified signal is outputted from the second differential amplifier as a second output signal. The comparator compares the first output signal and the second output signal and then, a comparison result is fedback to the signal processing section.

Thereby, the first differential amplifier and the second differential amplifier can inverse phase of differential output signals in same phase or opposite phase with reference to the reference voltage. Therefore, with respect to either one of the first output signal and the second output signal, phase of one of them is inverted with reference to the reference voltage so that the first output signal and the second output signal can be set in same phase in case there is a 180-degree phase difference between differential output signals. Without capacitor element and a predetermined signal processing circuit, employment of the first and second differential amplifiers works out as DC offset canceller such that phase components between the first output signal and the second output signal are cancelled out each other, DC offset components equivalent to DC components are extracted, the extracted DC offset components are compared, and the comparison result is feedback to the signal processing section so as to cancel DC offset.

The DC offset cancel circuit directed to another aspect of the present invention thus can be constituted by the first and second differential amplifiers without employing a capacitor element. Accordingly, DC offset cancel circuits employing a capacitor element sometimes require large-volume capacitor elements so as to set frequency band of offset components to sufficiently low frequency band, which is to prevent effective signal components from being cut out. On the other hand, the DC offset cancel circuit directed to another aspect of the present invention can be structured with compact circuit scale, whereby such a compact scaled DC offset cancel circuit can realize miniaturization, weight saving, and multi-function design of receivers.

Furthermore, in case a predetermined time slot is set as offset-quantity detection time, the DC offset cancel circuit directed to another aspect of the present invention can always detect offset quantity, different from a case of using a signal processing circuit that detects offset quantity during the predetermined time slot only. Thereby, offset quantity can be detected continuously even while intermittence periods between predetermined time slots, which are not set as offset-quantity detection time. This is preferable because the DC offset cancel circuit can keep up with transitional fluctuation of offset quantity.

Furthermore, since no capacitor element is employed, the DC offset cancel circuit directed to another aspect of the present invention can keep up with high-speed signals even if offset quantity is detected during the predetermined time slot only. Still further, since no signal processing circuit is employed, the DC offset cancel circuit can cope with offset-quantity detection operation that is conducted continuously in terms of time. Accordingly, this DC offset cancel circuit can be applied to both communication systems, namely, TDMA and non-TDMA. It is applicable to dual-mode-structured receivers that are compatible with the both communication systems and such receivers can be realized with compact circuit scale.

The above and further objects and novel features of the invention will more fully appear from the following detailed description when the same is read in connection with the accompanying drawings. It is to be expressly understood, however, that the drawings are for the purpose of illustration only and are not intended as a definition of the limits of the invention.

BRIEF DESCRIPTION OF THE DRAWINGS

FIG. 1 is a diagram for illustrating principle of the present invention;

FIG. 2 is a circuit block diagram showing a DC offset cancel circuit directed an embodiment;

DETAILED DESCRIPTION OF THE PREFERRED EMBODIMENTS

Figure 3:
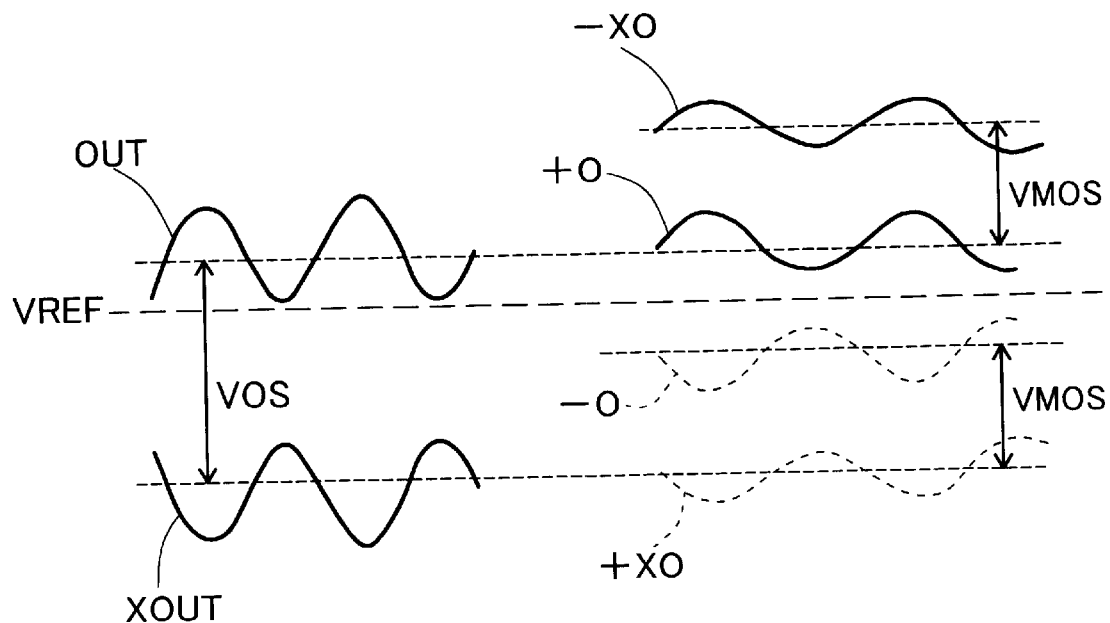
FIG. 3 is an operational waveform diagram showing operation of a DC offset cancel circuit directed to an embodiment.

Firstly, principle of the present invention will be described by referring to FIG. 1. In FIG. 1, input signals (IN1, IN2, . . .) are amplified by a signal processing section 1 and output signals (OUT1, OUT2, . . . ) having at least two phases different to each other are outputted. Out of the output signals (OUT1, OUT2, . . . ), at least any one of them (OUT1, . . . ) is inputted to a phase converter unit 4. A signal outputted from a phase converter unit 4 and at least any one of signals not to be inputted to the phase converter unit are inputted to a comparator unit 5. A comparison result at the comparison unit 5 is feedback to the signal processing section 1, whereby DC offset components of respective signals offset each other and DC offset from the output signals (OUT1, OUT2, . . . ) are cancelled.

In case DC offset components are included between output signals (OUT1, . . . ) and (OUT2, . . . ) phases of which are different from each other, the phase converter unit 4 converts a phase of one of the output signals, in this case, (OUT1, . . . ) into another phase same as the output signal (OUT2, . . . ). Since phases of the signals to be compared with have same phase, different phase components cancel each other out and the comparison unit 5 compares DC offset components equivalent to DC components of the signals are compared.

Next, an embodiment of an inventive DC offset cancel circuit will be described in detail by referring to FIG. 2 through FIG. 4.

FIG. 2 shows a DC offset cancel circuit directed to an embodiment of the present invention. As an example, there will be described a case that differential input signals IN, XIN are amplified by a variable gain amplifier (VGA) 11 and differential output signals OUT, XOUT are consequently outputted. Differential output signals OUT and XOUT are inputted to a reference voltage generating circuit 12 and further inputted to non-inversion input terminals of differential amplifiers 13 and 14, respectively. Reference voltage VREF outputted from the reference voltage generating circuit 12 is inputted to inversion input terminals of the differential amplifiers 13 and 14. Furthermore, the differential amplifiers 13 and 14 have differential output terminals (+o, −o) and (+xo, −xo), respectively. The non-inversion output terminal +o of the differential amplifier 13 and the inversion output terminal −xo of the differential amplifier 14 are connected to differential input terminals of the comparator 15. Furthermore, differential output terminals ICAN, XICAN of the comparator 15 are connected to the variable gain amplifier (VGA) 11 so as to feedback a feedback signal there.

Each of the differential amplifiers 13 and 14 amplifies a difference between signals inputted to its differential input terminals and outputs a difference signal. Accordingly, differential output signals (+o, −o) and (+xo, −xo) that are turned over against reference voltage VREF are outputted to the differential output terminals (+o, −o) and (+xo, −xo), respectively. In the embodiment as shown in FIG. 2, reference voltage VREF is inputted to the inversion input terminals. Accordingly, out of the differential output terminals (+o, −o) and (+xo, −xo), signals +o and +xo to be outputted to the non-inversion output terminals +o and +xo are in phase same as the differential output signals OUT, XOUT, respectively, and signals −o and −xo to be outputted to the inversion output terminals −o and −xo are in phase opposite to the differential output terminals +o and +xo, respectively. Since phase difference between differential output signals OUT and XOUT is 180 degrees, a phase difference between the signals +o and −xo outputted from the non-inversion output terminal +o and the inversion output terminal −xo is nothing (same phase).

Signals +o and ·xo having same phase are inputted to the differential input terminals of the comparator 15. A differential signal between the signals +o and ·xo are differentially amplified with a predetermined gain, whereby differential signals ICAN, XICAN in accordance with a difference signal. Since signals +o and ·xo to be inputted have same phase, the difference signal differentially amplified is a DC component. Therefore, signals in accordance with DC offset components are compared.

The differential amplifiers 13 and 14 may have similar circuit structure so that characteristic of input signals and output signals such as gain can be equal between the differential amplifiers 13 and 14. Thereby, DC signal components of the signals +o and ·xo are cancelled out each other and DC offset components of the signals can be compared.

FIG. 3 shows an operational waveform diagram directed to the embodiment as shown in FIG. 2. Differential output signals OUT, XOUT outputted from the variable gain amplifier (VGA) 11 have a 180-degree phase difference and hold DC offset voltage VOS. Those differential output signals OUT, XOUT are inputted to the non-inversion input terminals of differential amplifiers 13, and 14, respectively. Reference voltage VREF inputted to the inversion input terminals of differential amplifiers 13, and 14 has intermediate voltage level between DC voltage levels of the differential output signals OUT and XOUT. To be more specific, the reference voltage VREF is set to voltage level approximately between the mean voltage level and voltage level of an output signal OUT.

The differential amplifiers 13 and 14 differentially amplify the differential output signals OUT, XOUT by a unit of predetermined gain depending on a difference signal against the reference voltage VREF and output differential output signals (+o and −o) and (+xo and −xo), respectively. Since the differential amplifiers 13 and 14 have circuit structure similar to each other, their respective differential output signals (+o and −o) and (+xo and −xo) have equivalent gain and furthermore, there is 180-degree phase difference between differential output signals +o and −o, and between differential output signals +xo and −xo. Furthermore, since the differential output signals OUT and XOUT are inputted to non-inversion input terminals of the differential amplifier 13, and 14, respectively, the output signal OUT and the signal +o are signals of same phase and so are the output signal XOUT and the signal −xo. Accordingly, the signals +o and −xo are signals of same phase and so are the signals −o and +xo.

Furthermore, DC voltage level difference VMOS between the signals −o and +xo and DC voltage level difference VMOS between the signals +o and −xo are set to the reference voltage VREF that is intermediate voltage level between the differential output signal OUT and XOUT. Since the intermediate voltage level deviates from mean voltage level of two signals, the DC voltage level difference VMOS is equivalent to difference voltage of voltage level difference between the reference voltage VREF and DC voltage level of the differential output signal OUT, and voltage level difference between the reference voltage VREF and DC voltage level of the differential output signal XOUT.

It should be noted that connection manner of input/output terminals of the differential amplifiers 13, and 14 is not limited to what is shown in FIG. 2. As another connection manner, the output signals OUT and XOUT may be inputted to the non-inversion input terminal of the differential amplifier 13 and the inversion input terminal of the differential amplifier 14, respectively. Alternatively, the output signals OUT and XOUT may be inputted to the inversion input terminal of the differential amplifier 13 and the non-inversion input terminal of the differential amplifier 14, and outputted from the non-inversion output terminals +o of the differential amplifier 13 and +xo the differential amplifier 14, respectively, or outputted from the inversion output terminals −o of the differential amplifier 13 and −xo, respectively. Needless to say, the alternative connection manners as indicated above can obtain functions and effects similar to the embodiment of FIG. 2.

Figure 4:
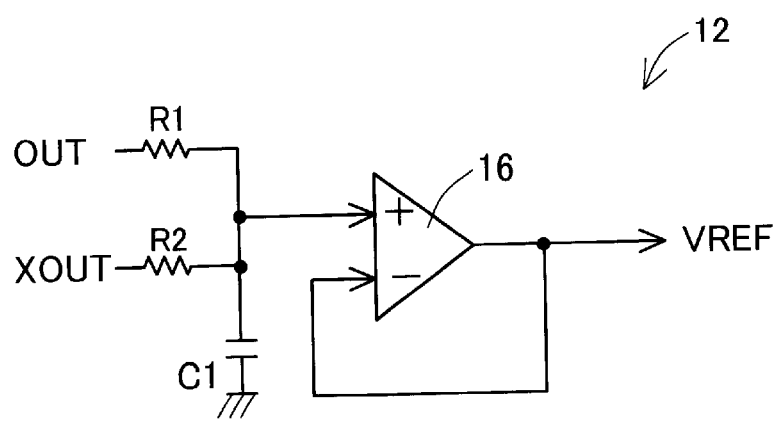
FIG. 4 is a circuit diagram showing a specific example of a reference voltage generating circuit.
Figure 5:
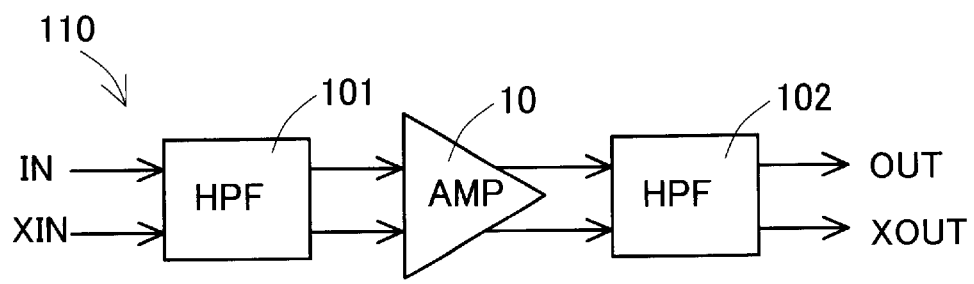
FIG. 5 is a circuit block diagram directed to first prior art where correction is conducted by highpass filters.
Figure 6:
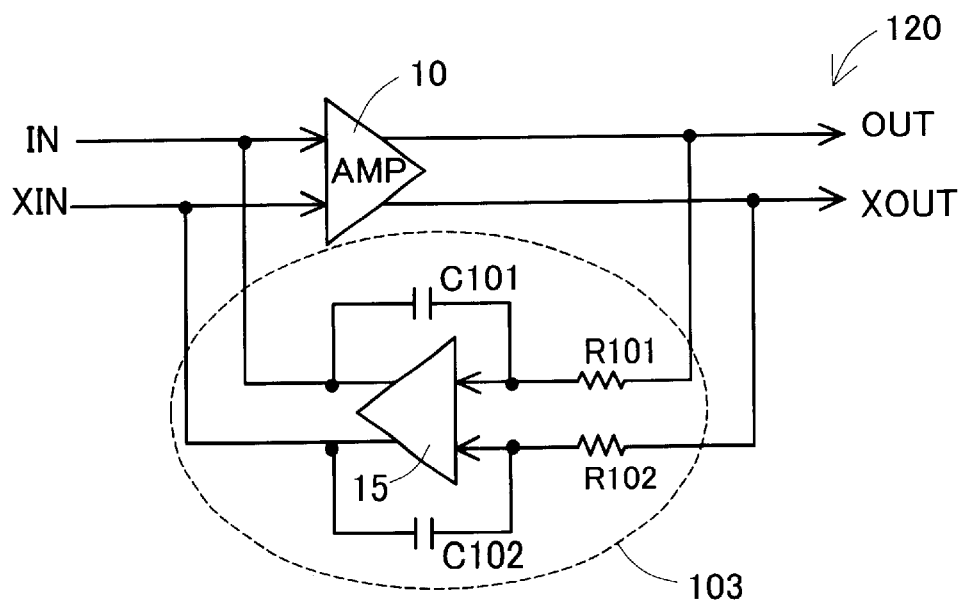
FIG. 6 is a circuit block diagram directed to second prior art where correction is conducted by an integration circuit.
Figure 7:
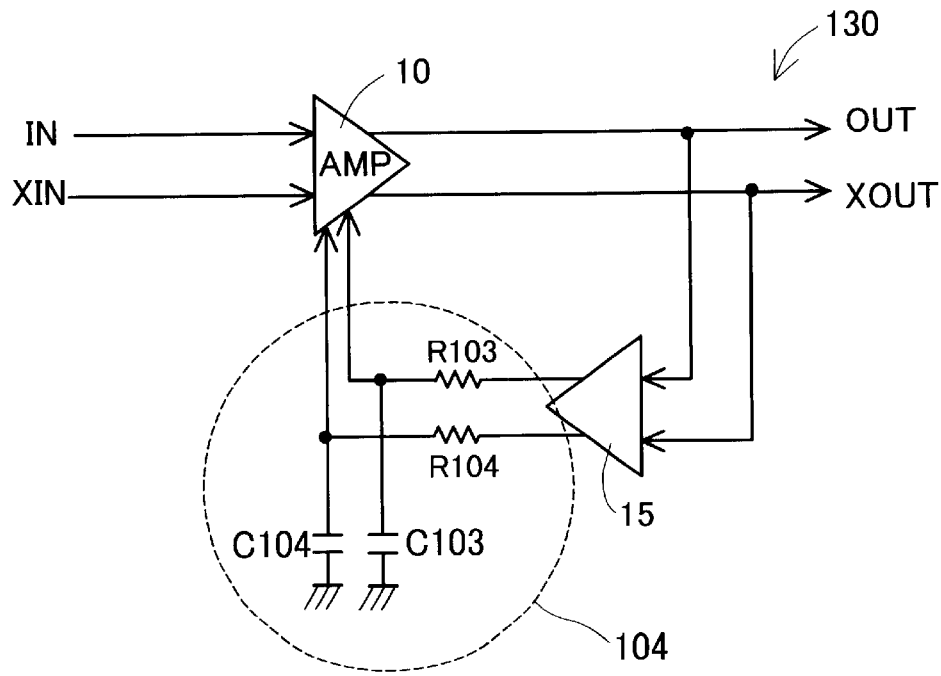
FIG. 7 is a circuit block diagram directed to-third prior art where correction is conducted by a lowpass filter.
Figure 8:
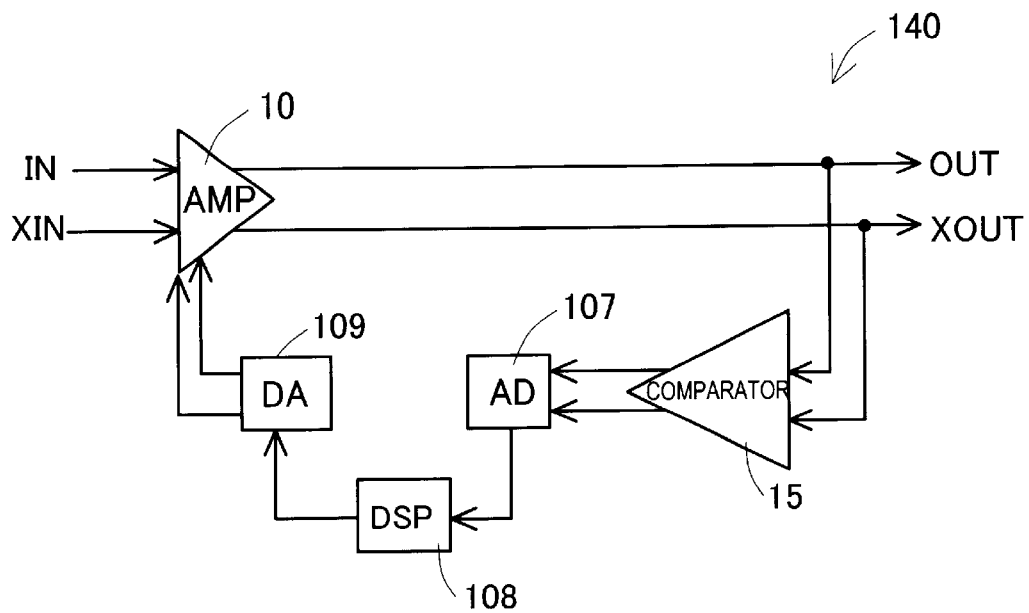
FIG. 8 is a circuit block diagram directed to fourth prior art where correction is conducted in a manner of digital adjustment.
Figure 9:
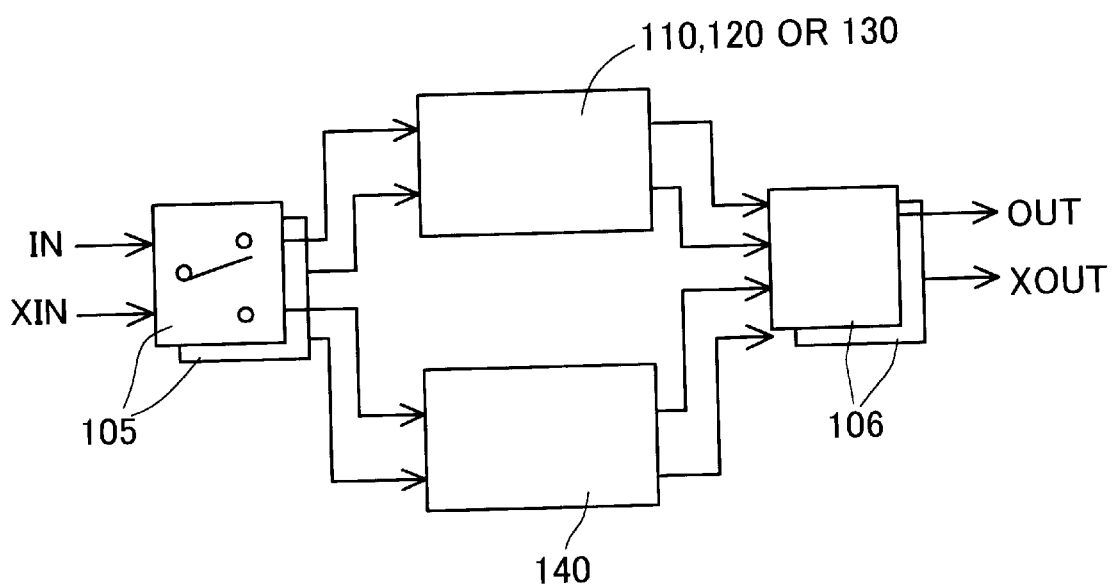
FIG. 9 is a circuit block diagram of conventional dual mode structure.

Next, a specific example of a reference voltage generating circuit 12 by referring to FIG. 4. Output signals OUT, XOUT are inputted to one of the terminals of resistance elements R1, R2, respectively. The other terminals of the resistance elements R1, R2 are connected to one of the terminals of a capacitor element C1, other terminal of which is connected to ground voltage and a non-inversion input terminal of an amplifier 16 that constitutes a voltage follower, respectively, and reference voltage VREF is outputted from an output terminal of the amplifier 16.

When DC voltage level of the differential output signals OUT, XOUT are denoted as VO, VXO, respectively and resistance values of the resistance elements R1, R2 are assumed as R1, R2, respectively, voltage value obtained at the non-inversion input terminal of the amplifier 16 approximates reference voltage VREF due to imaginary short circuit characteristics of the amplifier 16. Accordingly, there is obtained a relational expression of current that flows through the resistance elements R1, R2, as indicated below.

$$(VREF-VO)/R1=(VXO-VREF)/R2$$

There is obtained an expression solved with respect to the reference voltage VREF, as indicated below.

$$VREF=(R2/(R1+R2))\times VO+(R1/(R1+R2))\times VXO$$

That is to say, the reference voltage VREF becomes arithmetic mean voltage level such that DC voltage levels VO, VXO of the differential output signals OUT, XOUT are proportionally divided by the resistance values R1, R2, respectively and the two quotients are added up. Suppose that the resistance elements R1 and R2 have resistance value different from each other. Since the reference voltage VREF is voltage equivalent to what is weighed and proportionally divided by the resistance values R1, R2, there can be obtained an arithmetic mean voltage level determined by weighting different from mean voltage level between the DC voltage levels VO and VXO directed to the differential output signals OUT, XOUT, respectively. (It should be noted that when the resistance values R1 and R2 are equal, the reference voltage VREF is equal to mean voltage level.)

The capacitor element C1 constitutes a lowpass filter between the resistance elements R1 and R2, whereby AC signal components are eliminated from voltage level at the non-inversion terminal of the amplifier 16.

As described, according to the DC offset cancel circuit directed to the present embodiment, the differential amplifiers 13, 14, namely, a first differential amplifier and a second differential amplifier, can inverse phase of differential output signals OUT, XOUT in same phase or opposite phase with reference to the reference voltage VREF and output those signals as output signal. Therefore, out of signals +o and −xo, namely a first output signal and a second output signal, phase of the second output signal −xo may be inverted with reference to the reference voltage VREF so that the differential output signals OUT and XOUT having 180-degree phase difference can be set in same phase between signals +o and −xo. Without capacitor elements and predetermined signal processing circuit, employment of the two differential amplifiers 13 and 14 works out as DC offset canceller such that phase components between the signals +o and −xo are cancelled out each other, DC offset components equivalent to DC components are extracted, the extracted DC offset components are compared, and the comparison result is feedback to the variable gain amplifier (VGA) 11 as signal processing section so as to cancel DC offset components.

Since the differential amplifier 13 is structured same as the differential amplifier 14 that generates signal −xo phase of which is inverted, phase of the signal +o outputted from the differential amplifier 13 and inverted phase of the signal −xo phase of which is inverted and outputted are in same phase and AC signal components of those signals become equivalent. Therefore, AC signal components between two signals can be cancelled out each other and DC components of them can be compared.

The differential output terminals +o and −o of the differential amplifier 13 and the differential output terminals +xo and −xo of the differential amplifier 14 output pairs of differential output signals (+o, −o) and (+xo and −xo), respectively and there is 180-degree phase difference between these paired signals. These two pairs of differential output signals (+o, −o) and (+xo and −xo) are in same phase and in opposite phase with respect to the differential output signals OUT, XOUT, respectively. Therefore, two signals in same phase may be appropriately combined by selecting one by one from the two pairs of differential output signals (+o, −o) and (+Xo and −xo) so that the comparator 15 cancel out AC signal components and compare DC offset components. Furthermore, even though input relation of the output signals OUT, XOUT to the differential amplifiers 13, 14 is changed, two signals may be appropriately combined from the two pairs of differential output signals (+o, −o) and (+xo and −xo), whereby two signals in same phase can be selected.

Furthermore, since voltage level of the reference voltage VREF is intermediate voltage level that deviates from the mean voltage level between the differential output signals OUT, VOUT, voltage level of the signals +o, −xo outputted after differentially amplified with reference to the reference voltage VREF is responsive to voltage level of difference voltage between the reference voltage and DC voltage level of respective differential output signals OUT, XOUT. Accordingly, voltage level difference between the signals +o and −xo can be a finite value as long as DC offset components exist. Thereby, voltage level difference can be extracted in response to DC offset quantity.

Furthermore, the reference voltage generating circuit 12 as reference voltage generating section outputs reference voltage VREF voltage level of which is determined by arithmetic mean voltage level with respect to the resistance values R1, R2 and voltage level of the differential output signals OUT, VOUT. As for the arithmetic mean voltage level, the resistance elements R1, R2 as first resistance section and second resistance section, have the resistance values R1 and R2, respectively, these resistance values R1 and R2 have different values and two different values of weightings of R1 and R2 are put on the voltage levels of the differential voltage output signals OUT and XOUT. Thereby, voltage level of the reference voltage VREF can be set to intermediate voltage level that is not the same as the mean voltage level. Furthermore, in addition to the resistance elements R1, and R2, the capacitor element C1 is provided to constitute a lowpass filter. Therefore, the reference voltage VREF is outputted on condition that the lowpass filter eliminates AC components of the arithmetic mean voltage level filter, whereby, reference voltage VREF having stable DC voltage level can be supplied.

A DC offset cancel circuit thus can be constituted by the two differential amplifiers 13 and 14 without employing a capacitor element. DC offset cancel circuits employing a capacitor element sometimes require large-volume capacitor elements so as to set frequency band of offset components to sufficiently low frequency band, which is to prevent effective signal components from being cut out. On the other hand, the DC offset cancel circuit directed to the present embodiment can be structured with compact circuit scale, whereby such a compact scaled DC offset cancel circuit can realize miniaturization, weight saving, and multi-function design of receivers.

Furthermore, in case a predetermined time slot is set as offset-quantity detection time, the DC offset cancel circuit directed to the embodiment can always detect offset quantity, different from a case of using a signal processing circuit that detects offset quantity during the predetermined time slot only. Thereby, offset quantity can be detected continuously even while intermittence periods between predetermined time slots, which are not set as offset-quantity detection time. This is preferable because the DC offset cancel circuit can keep up with transitional fluctuation of offset quantity.

Furthermore, since no capacitor element is employed, the DC offset cancel circuit of the present embodiment can keep up with input signals IN, XIN that are high-speed signals even if offset quantity is detected during the predetermined time slot only. Still further, since no signal processing circuit is employed, the DC offset cancel circuit can cope with offset-quantity detection operation that is conducted continuously in terms of time. Accordingly, this DC offset cancel circuit can be applied to both communication systems, namely, TDMA and non-TDMA. It is applicable to dual-mode-structured receivers that are compatible with the both communication systems and such receivers can be realized with compact circuit scale.

The present invention is not limited to the embodiment described above and may of course be improved or modified in various manners within the scope and spirit of the present invention.

For example, the present embodiment describes a case of canceling DC offset included in differential output signals OUT, XOUT outputted from the variable gain amplifier (VGA) 11, however, the present invention is not limited to this. The present invention is applicable to a signal processing section that outputs signals of three or more phases. In case output signals are structured with two or more pairs of differential signals, the present embodiment may be applied to each differential signal pair so as to compare DC components on condition that AC signal components are cancelled out each other.

Furthermore, a signal processing section is not limited to the variable gain amplifier (VGA) 11. Other than the variable gain amplifier, other types of amplifiers, active filters or the like are applicable as signal processing section.

According to the present invention, there can be provided a DC offset cancel circuit capable of canceling DC offset regardless TDMA system and non-TDMA system, with simple circuit structure, and applicable to dual-mode-structured receivers.

What is claimed is:

1. A DC offset cancel circuit for canceling DC offset components between signals that constitute output signals having at least two phases different to each other when the output signals are outputted from a signal processing section, the DC offset cancel circuit comprising:

a phase conversion section for converting at least any one of the output signals into at least any one of phase-converted signals phase of which is same as a phase of at least any one of other output signals; and a comparator section for comparing one of the other output signals and the phase-converted signal and for feeding-back a comparison result to the signal processing section.

2. A DC offset cancel circuit according to claim 1, wherein the output signals include at least one pair of signals that have 180-degree phase difference, one of the phase-converted signals is one of the pair of signals phase of which is inverted, and one of the other output signals is other one of the pair of signals.

3. A DC offset cancel circuit according to claim 1, wherein an AC signal component of one of the other output signals is equivalent to an AC signal component of one of the phase-converted signals.

4. A DC offset cancel circuit according to claim 3, wherein except its phase, an AC signal component of a source signal of one of the phase-converted signals is kept as it is.

5. A DC offset cancel circuit according to claim 3, wherein one of the other output signals is compared with one of the phase-converted signals on condition that an AC signal component of the one of the other output signal has been converted to same as an AC signal component of one of the phase-converted signals.

6. A DC offset cancel circuit according to claim 1, wherein the signal processing section includes an amplifier.

7. A DC offset cancel circuit according to claim 1, wherein the signal processing section includes an active filter.

8. A DC offset cancel circuit for canceling DC offset components between two differential output signals when the differential output signals are outputted from a signal processing section, the DC offset cancel circuit comprising:

a first differential amplifier to which one of the differential output signals is inputted;

a second differential amplifier to which other one of the differential output signals is inputted;

a reference voltage generating section that inputs reference voltage to the first differential amplifier and the second differential amplifier; and a comparator that compares a first output signal and a second output signal outputted from the fist differential amplifier and outputted the second differential amplifier, respectively.

9. A DC offset cancel circuit according to claim 8, wherein the fist differential amplifier and the second differential amplifier include their respective differential output terminals, and the first output signal and the second output signals are a combination of two in-phase signals among differential signals outputted from each of the differential output terminals.

10. A DC offset cancel circuit according to claim 9, wherein both of the differential output signals are inputted to a non-inversion input terminals or inversion input terminals of the fist differential amplifier and the second differential amplifier, and the first output signal and the second output signal are outputted from a non-inversion output terminal of the first differential amplifier and an inversion output terminal of the second differential amplifier, respectively, or outputted from an inversion output terminal of the first differential amplifier and a non-inversion output terminal of the second differential amplifier, respectively.

11. A DC offset cancel circuit according to claim 9, wherein the differential output signals are inputted to a non-inversion input terminal of the first differential amplifier and an inversion input terminal of the second differential amplifier or inputted to an inversion input terminal of the first differential amplifier and a non-inversion input terminal of the second differential amplifier, and both of the first output signal and the second output signal are outputted from non-inversion output terminals or inversion output terminals of the first differential amplifier and the second differential amplifier.

12. A DC offset cancel circuit according to claim 8, wherein the reference voltage is set to intermediate voltage level between DC voltage levels of the differential output signals, which is not equivalent to mean voltage level between the DC voltage levels.

13. A DC offset cancel circuit according to claim 8, wherein the reference voltage generating section comprises:

a first resistance section to one of terminals of which one of the differential output signals is inputted; and a second resistance section to one of terminals of which other one of the differential output signals is inputted and the second resistance section having a resistance value not same as the first resistance section, and wherein other terminals of the first resistance section and the second resistance section are mutually connected.

14. A DC offset cancel circuit according to claim 13, wherein the reference voltage generating circuit includes a capacitor section which is connected to other terminals of the first resistance section and the second resistance section.

15. A DC offset cancel circuit according to claim 8, wherein the signal processing section includes an amplifier.

16. A DC offset cancel circuit according to claim 8, wherein the signal processing section includes an active filter.

* * * * *